(12) United States Patent
Tuval (10) Patent No.: US 8,752,788 B2
(45) Date of Patent: Jun. 17, 2014

(54) WING AND A MULTIPLE PROPELLER AIRCRAFT

(75) Inventor: Miron Tuval, Ramat-Gan (IL)

(73) Assignee: Vestal Technologies Ltd., Raanana (IL)

( * ) Notice: Subject to any disclaimer, the term of this patent is extended or adjusted under 35 U.S.C. 154(b) by 257 days.

(21) Appl. No.: 12/742,667

(22) PCT Filed: Jan. 6, 2009

(86) PCT No.: PCT/IB2009/000006
§ 371 (c)(1),
(2), (4) Date: Jan. 20, 2011

(87) PCT Pub. No.: WO2009/069109
PCT Pub. Date: Jun. 4, 2009

(65) Prior Publication Data
US 2011/0108675 A1     May 12, 2011

(51) Int. Cl.
*B64C 39/06* (2006.01)
*B64C 3/16* (2006.01)
*B64C 39/02* (2006.01)
*B64C 3/32* (2006.01)
*B64C 11/00* (2006.01)
*B64C 39/04* (2006.01)

(52) U.S. Cl.
CPC .............. *B64C 3/16* (2013.01); *B64C 39/066* (2013.01); *B64C 39/024* (2013.01); *B64C 2201/165* (2013.01); *B64C 3/32* (2013.01); *B64C 2201/104* (2013.01); *B64C 2201/021* (2013.01); *B64C 11/001* (2013.01); *B64C 39/04* (2013.01)
USPC ........................................................ 244/34 A

(58) Field of Classification Search
CPC ....... B64C 39/062; B64C 39/066; B60V 1/08
USPC .................. 244/35 R, 12.4, 12.6, 118.5, 198
See application file for complete search history.

(56) References Cited

U.S. PATENT DOCUMENTS

| | | | | |
|---|---|---|---|---|
| 1,943,774 A * | 1/1934 | Shaw | ............................ | 244/12.6 |
| 2,510,959 A * | 6/1950 | Custer | ............................ | 244/55 |
| 2,589,994 A * | 3/1952 | Custer | ............................ | 244/35 R |
| 2,611,555 A * | 9/1952 | Custer | ............................ | 244/12.6 |
| 2,611,556 A * | 9/1952 | Custer | ............................ | 244/12.6 |
| 3,397,854 A * | 8/1968 | Reyle | ............................ | 244/55 |
| 3,524,611 A * | 8/1970 | Kurt | ............................ | 244/53 B |
| 5,597,137 A * | 1/1997 | Skoglun | ............................ | 244/12.4 |
| 6,474,604 B1 * | 11/2002 | Carlow | ............................ | 244/198 |
| 7,104,498 B2 * | 9/2006 | Englar et al. | ............................ | 244/12.6 |
| 7,520,466 B2 * | 4/2009 | Bostan | ............................ | 244/93 |

* cited by examiner

*Primary Examiner* — Valentina Xavier
(74) *Attorney, Agent, or Firm* — Reches Patents (57) ABSTRACT

A wing that includes a lower portion that is located between two curved portions; wherein the lower portion is substantially flat and the two curved portions extend above the lower portion; wherein the wing defines a space that is wider than twice a diameter of a propeller that introduces a quasi-laminar stream if positioned in proximity to the wing and is circulated at a desired speed. The curved portions can be arcuated ends of the wing.

15 Claims, 6 Drawing Sheets

WING AND A MULTIPLE PROPELLER AIRCRAFT

RELATED APPLICATION

This application is a National Phase Application of PCT International Application No. PCT/IB2009/000006, International Filing Date 6 Jan. 2009, claiming priority of Israeli Patent Application, 187,368, filed 14 Nov. 2007.

FIELD OF THE INVENTION

This invention relates to wings, to aircrafts, and especially to non-rotary wings that provide for aircrafts to become airborne vertically or after a very short run. Such air-vehicles are known either as "vertical take-off/landing aircrafts (VTOL) or very-short take-off/landing (VSTOL) aircrafts".

BACKGROUND OF THE INVENTION

Various types of VTOL and VSTOL crafts with non-rotary wings are known in the art. Willard Custer suggested utilizing semi-circular wings, which he produced and tested for the US DOD in 1943. These semi-circular wings are also known as the "Custer Channel Wing" (CCW). In essence, the Custer concept consisted in locating a propeller at the trailing edge of a half-circular profile that was made part of an ordinary wing. The quasi-laminar stream induced over the upper part of the 180° channel by the propeller, augments the lift.

Tests identified some definite advantages as well as important drawbacks. The most important advantage consisted in static lift coefficients of $C_L \geq 5$ generated at higher than usual thrust coefficients.

The drawbacks were many and can be associated with low-speed handling, cruise-drag, stability and control, and one-engine scenarios, all singularized by the following facts:

Redirected thrust was the main responsible for the high $C_L$ to the detriment of enhanced circulation;
High drag/lift ratio is generated by the channeled segment due to the peculiar orientation of the lift-vectors;
Difficulty in thrust-control leads to asymmetric thrust and thus, to instability created by asymmetric moments;
Channel leading-edge and trailing-edge stream-separation can occur at high attack-angles;
Poor low-speed control from the complementary conventional aerodynamic surfaces;
Nose-down pitch developed from aft-propeller loading on the channel-wing;
Non-uniform flow around the propeller resulted at high attack-angles; overall poor lift/drag ratio; and one-engine-out created control problems.

Because of its many operational problems, the USAF decided that the CCW, despite its high potential, was not yet at the point where its use could be justified.

Since then, the CCW sank in periodic oblivion with in-between new emergences of proposed improvements. Two such renewal attempts consist in boundary-layer control by pneumatic blowing and using winglets for stream containment.

Both methods resulted in excellent performance improvements.

A NASA-Langley sponsored program was accomplished at the Georgia Tech Research Institute (GTRI) where the pneumatic technology used dramatically improved the CCW performances. The pneumatic configuration adopted by GTRI combined Circulation Control Wing technology applied on the outboard wing panels with blowing over curved surfaces at the trailing edge of the Channel-Section. The trailing edge blowing succeeded to greatly augment the lift and thrust deflection without need of high attack-angles. Circulation Control on the outboard wing panels further augmented lift and low-speed controllability while providing additional drag when needed.

Double semi-circular wings (or channels) completed by two lateral stabilizing tips were tested in a number of CCW. In this concept contra-rotating pusher propellers were to be fitted at the trailing edge of the channels to produce both thrust and forced circulation over the upper-side of the profiles. A number of such crafts were built and took to air with questionable results.

AIAA published in 2002 a study made by J. F. Marchman (Aerospace and Ocean Engineering Dep't.) Virginia Tech titled "A Design for a Dual-Mode Personal Vehicle." This study discloses the results obtained by investigating a "Scoop Wing" made by disposing straight winglets on the top of an ordinary wing and by placing a single propeller between them at the trailing edge of the resulting rectangular-section channel. Once again, a substantial lift increase was obtained. Further, by closing the perpendicular winglets with a horizontal, staggered stabilizer, a box structure or "Box-Wing" of peculiarly positive characteristics was obtained at the cost of increased drag.

There is a growing need to provide effective non-rotary wings and aircrafts for vertical or short take-offs.

SUMMARY OF THE INVENTION

An aircraft that includes: multiple propellers that are rotated by multiple engines; wherein the multiple propellers are located in proximity to a wing that comprises a lower portion that is located between two curved portions; wherein the lower portion is substantially flat and the two curved portions extend above the lower portion; and wherein the wing defines a space that is wider at least than twice a diameter of a propeller out of the multiple propellers.

A wing that includes a lower portion that is located between two curved portions; wherein the lower portion is substantially flat and the two curved portions extend above the lower portion; wherein the wing defines a space that is wider than at least twice a diameter of a propeller that introduces a quasi-laminar stream if positioned in proximity to the wing and is circulated at a desired speed.

A wing that includes a lower portion that is located between two curved portions; wherein the lower portion is substantially flat and the two curved portions extend above the lower portion; wherein the wing defines a space in which at least two engines can be placed so that a distance between centers of two adjacent engines exceeds the sum of the radiuses of the propellers that are rotated by the engines.

The wing can include an upper structural element that is located above the lower portion and is connected to upper portions of the two curved portions.

The wing can further include multiple shrouds, each shroud being located above a propeller.

The wing can further include multiple shrouds wherein a shape formed by the multiple shrouds differs from a mirror image of a shape formed by the lower portion and two curved portions.

The wing can define an elongated space.

The lower portion can be configured to support multiple engines.

The wing can define a space that is wider between the curved portions than the sum of the propellers' diameters.

The lower portion can extend beyond the curved portions so that a rear end of the lower portion is positioned beyond a rear end of each of the two curved portions.

The upper end of each of the curved portions can be connected to an end of one shroud out of multiple shrouds that are located above propellers.

The propellers can be proximate to the trailing-edge of the wing.

The curved portions can be connected to supplementary wings.

The curved portions can be connected to supplementary wings at a location that is above half a height of the curved portions.

The curved portions can be connected to supplementary wings at a location that is below half a height of the curved portions.

The curved portions can be connected to wing stubs that in turn are connected to supplementary wings.

The trailing-edge of the wing can be shaped for obtaining a Coanda effect.

The curved portions of the wing can be arcuated ends of the wing.

BRIEF DESCRIPTION OF THE DRAWINGS

The concept and its applications are depicted here in a number of drawings in which the components are noted as follows.

DETAILED DESCRIPTION OF THE DRAWINGS

In the following specification, the invention will be described with reference to specific examples of its embodiments. It is, however, evident that various modifications and changes may be made therein without departing from the broader spirit and scope of the invention as set forth in the appended claims.

Because the apparatus implementing the present invention is chiefly meant to serve dedicated flying platforms for electronic systems, and being itself composed of such components and circuits known to those skilled in the art, electronic and electric circuit details will not be explained but to the extent considered necessary for understanding and appreciating the underlying concepts of the present invention.

A wing and an aircraft that includes the wing are provided. The wing is shaped as an elongated and curved scoop—defined by a lower portion that is located between two curved portions that can be arcuate ends of the lower portion.

The lengthened space at least partially overlaps the tip-trajectories of at least two propellers. This wing can also be referred to as a "Flow Inducing Duct" or "FLINDUCT", and can fit to the frame of an aircraft. The FLINDUCT can replace an existing wing or can be a part of a newly manufactured aircraft.

The aircraft can further include supplementary wings (also referred to as external wings or outboard wings), to be connected as necessary, to the FLINDUCT or to any other structural part of said aircraft.

The FLINDUCT should be made large enough to enable the placement of at least two propellers and corollary motive means side by side, provided that the propellers do not extend beyond said span.

The propellers can be located behind the trailing edge of the FLINDUCT, in front of the leading edge of the FLINDUCT or in between the trailing edge and leading edge of the FLINDUCT—but do not extend to the outside of its inner span.

Propellers that are proximate to the leading edge of the FLINDUCT can be referred to as leading propellers. Propellers that are proximate to the trailing edge of the FLINDUCT can be referred to as trailing propellers.

The propellers, when turning at a given angular velocity, would induce a high-speed quasi-laminar flow over the upper surface of the FLINDUCT.

FLINDUCT may include shrouds that enclose the upper part of each propeller-tip trajectory.

The aircraft may also include supplementary wings that are connected at any location external to the arcuated sides of the FLINDUCT. The said outboard wings may be attached to bridging elements such as booms that are also abutting to the FLINDUCT. Said complementary wings would be fitted at locations that guarantee minimum drag-induction and/or maximum operational efficiency.

Figure 1:
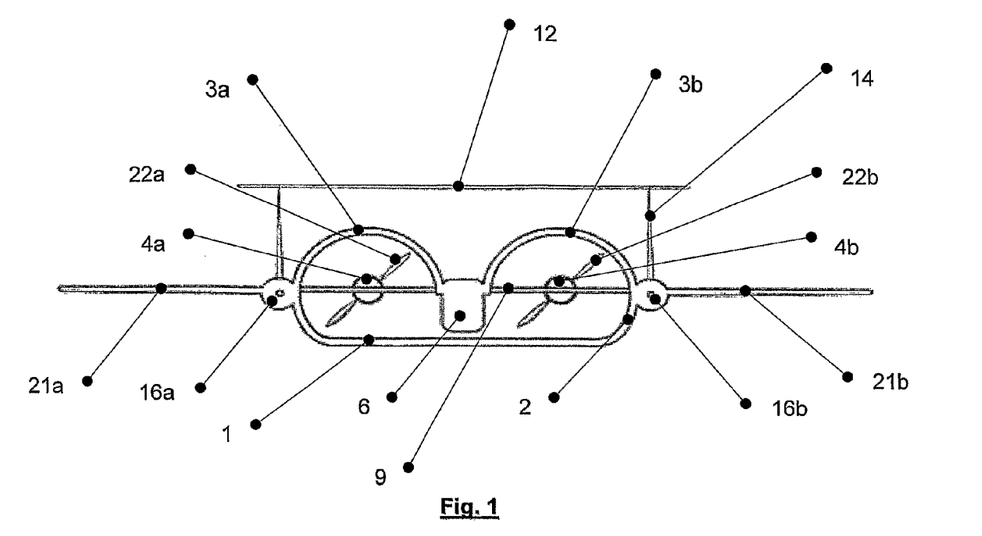
FIGS. 1, 1b and 5 are front views of aircrafts according to various embodiments of the invention.
Figure 1B:
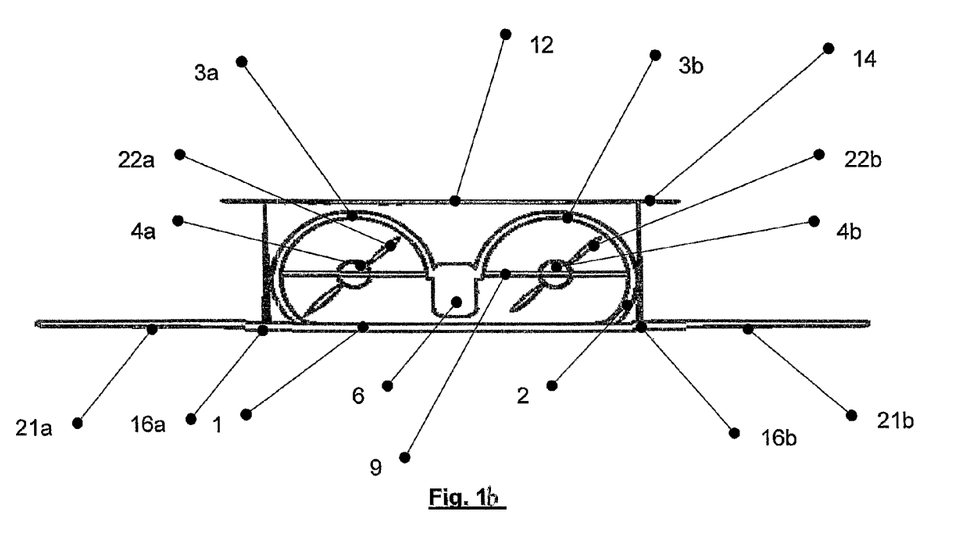
Figure 2:
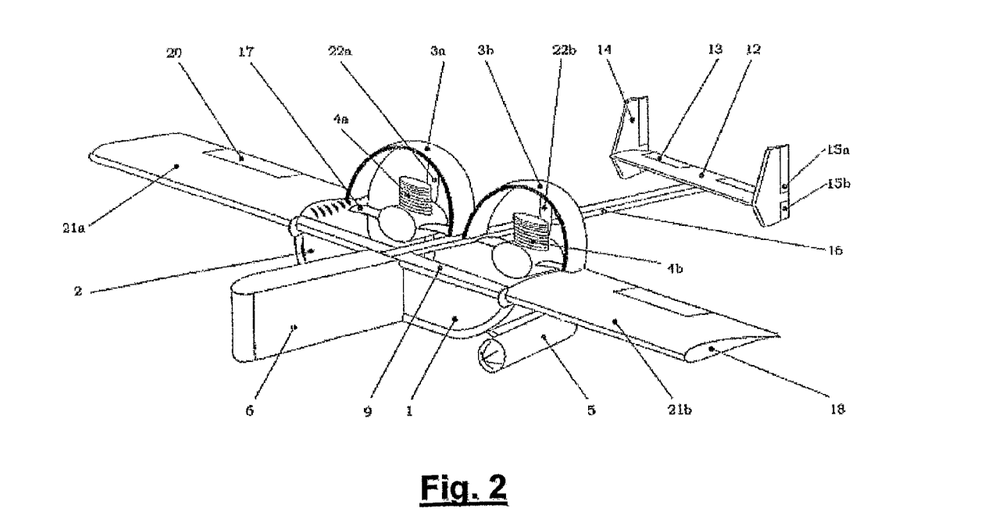
FIGS. 2, 3 and 7 are isometric views of aircrafts according to various embodiments of the invention.

FIGS. 1 and 2 illustrate outboard wings 21a and 21b that are located in a plane tangent to the tips of the arcuated sides of the FLINDUCT 2. FIG. 1b illustrates the additional example of outboard complementary wings 21a and 21b located in the same plane with the lower portion 1 of the FLINDUCT. Outboard wings 21a and 21b may be mounted at any location between the upper and the lower end of the arcuated sides of FLINDUCT.

By its dedicated integration with any chosen aircraft frame, FLINDUCT would provide aerodynamic and structural solutions towards correcting the negative aspects of the CCW and of the Marchman Box-Wing.

FLINDUCT differs from the CCW in many aspects, such as, but not limited to an elongated channel-structure, and the inclusion of multiple propellers within (or at least partially within) the space defined by the elongated-channel.

The propellers can be disposed in trailing-edge shrouds that may be asymmetric in the sense that their shape is not necessarily mirrored by the shape of the below extending lower portion of FLINDUCT, although fully symmetric shrouds may be as well used. When FLINDUCT includes two or more propellers, the diameter of each shroud would be that necessary to have all of the propellers shrouded along the whole, or part of its span.

These shrouds may enhance the aerodynamic flow by achieving effects similar to those provided by blow-controlled circulation. This configuration is intended to provide quasi-vertical, or very short take off and landing capability while eliminating many of the operational problems of both the original Channel Wing aircraft and the Rectangular Scoop-Wing.

Wind-tunnel tests conducted on blown semi-circular channel wings at GTRI-Georgia Tech Research Institute (19-22 Jun., 2000) made by Robert J. Englar have shown substantial lift capabilities with $C_L$ values of 8.5 to 9.0 at
$\acute{\alpha}=10°$ and stall angles in excess of 45° at constant $C_D$ (abstraction being made of the high thrust values when the propeller acts on the wing).

Greater flexibility in Super STOL mode was obtained by canting the semi-circular channel inwards towards its trailing-edge, at an angle (4°-5°).

The proposed FLINDUCT can adopt the results of the above experiments. Transforming the semi-circular channel of the CCW into an oblong channel, more like a Box-Wing of curved ends, provides for the possibility to fit more than one propeller inside the space defined by the so formed duct (this space may also be referred to as "oblong channel"), the propellers' discs being preferably located at its trailing-edge. This configuration produces effects similar to those of a blown profile but at lesser complexity and higher cost efficiency.

FIG. 1 illustrates the typical example of a FLINDUCT equipped aircraft that includes complementary outboard wings 21a and 21b, which are located above the center of gravity of the aircraft. Said wings 21a and 21b are connected to the arcuated tips 2 of the FLINDUCT.

The upper end of curved ends 2 are attached to bridging or transition elements such as 16a and 16b that are abutting the outboard wings 21a and 21b. The upper ends of arcuated tips 2 join the structural element 9 that is parallel to the lower portion 1 of the FLINDUCT, preferably being part of the spar that passes trough wings 21a and 21b. It would be of advantage to have the exposed part of element 9 aerodynamically shaped for lift generation at minimum drag.

The structural element 9 would be located above the FLINDUCT bottom 1, with the option of front or back stagger.

In this specific example, engines 4a and 4b would be supported by pylons that may be connected to the FLINDUCT and/or to additional structural frame elements. For example, referring to the aircraft of FIG. 2, engines 4a and 4b are supported by pylons 17 that are connected to the arcuated sides 2, and to boom (also referred to as elongated structural elements) 16 that structurally connects craft nose 6 to its tail unit.

Figure 3:
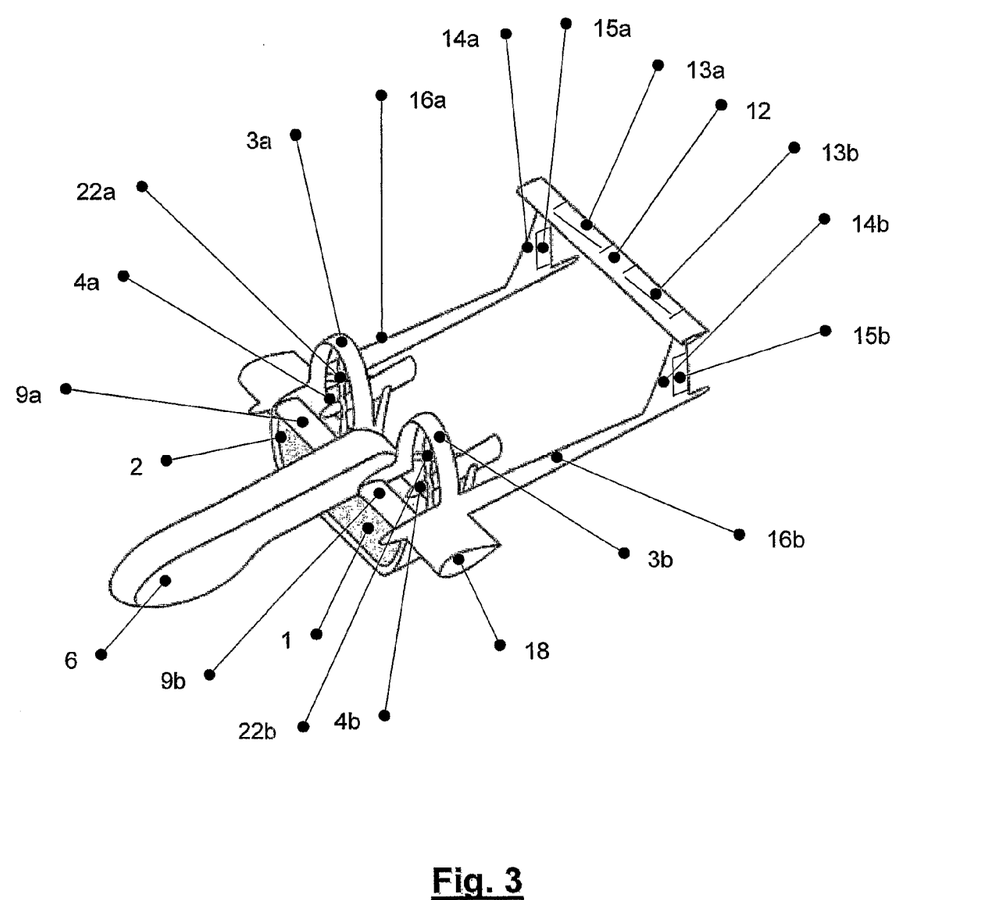
Figure 4:
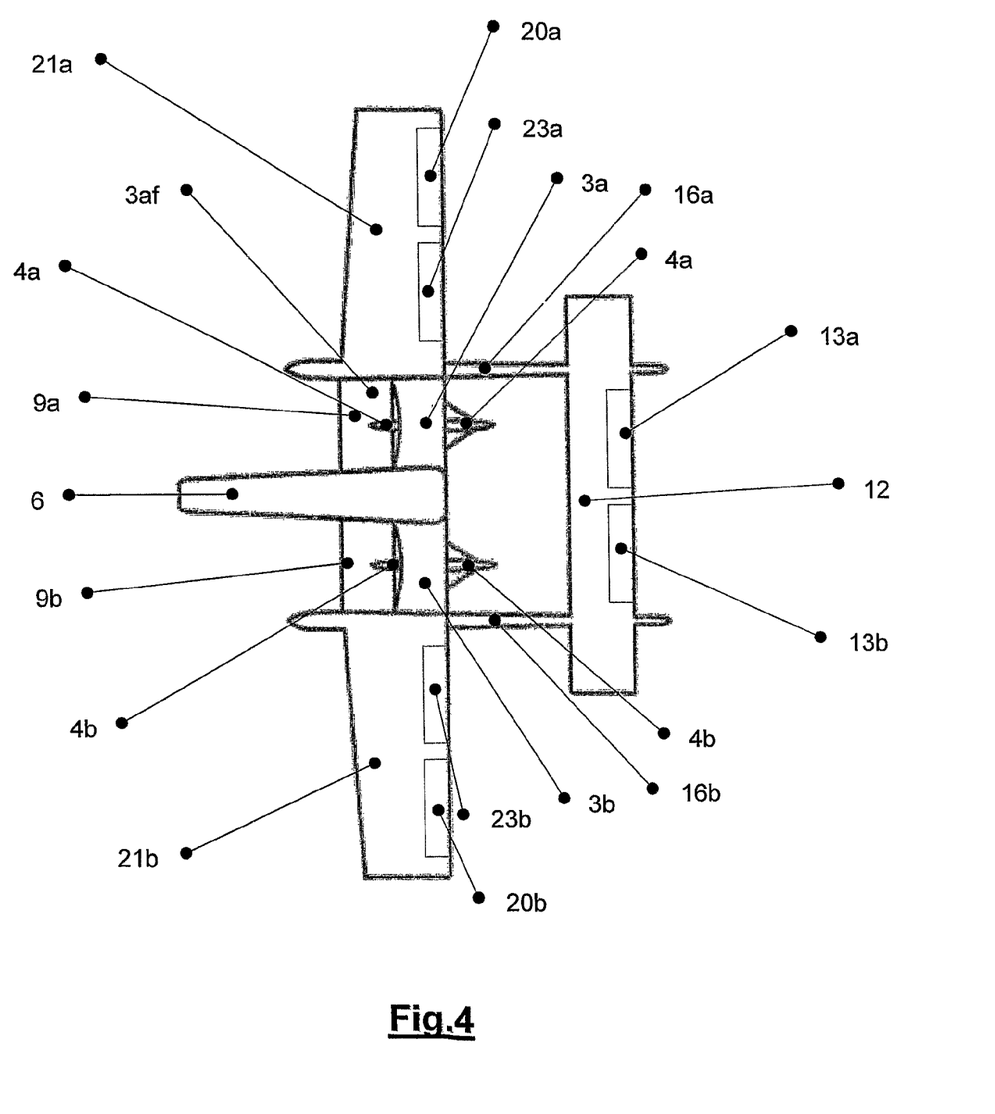
FIGS. 4 and 6 are top views of aircrafts according to various embodiments of the invention.

FIG. 2 illustrates an additional typical example of FLINDUCT use, whereby engine mountings 17 as being located at the same plane with outboard wings 21a and 21b, although their location might be different as illustrated in FIGS. 3 and 4 where the engines are positioned below the plane of the outboard wings 21a and 21b—while connected to the trailing edge of the FLINDUCT beyond which they extend.

Although FLINDUCT may include a separate shroud for each propeller, this is not always the case. FIGS. 1, 1b, 2, 3 and 4 illustrate shrouds 3a and 3b. Each shroud would have a semi-circular shape that corresponds to the trajectory of the tips of the propeller above which the shroud is located. The shrouds are optional—as shown by the example of the shroud-less aircraft of FIGS. 5-7.

The shrouds may be self-standing or made part of FLINDUCT—for example—they can be connected to the upper end of the arcuated tips 2 as illustrated in FIGS. 1 and 2.

The shrouds are preferably positioned near the trailing edge of the FLINDUCT, and would favor aerodynamic chords shorter than those of the FLINDUCT.

FLINDUCT may be fitted with stubs dedicated to the attachment of outboard wings. Such stubs would provide for structural modularity and quick field-assembly of FLINDUCT-equipped crafts FIG. 3 illustrates such stubs 18 that are fitted to the upper end of the curved tips 2, and are part of the spar element 9.

Figure 5:
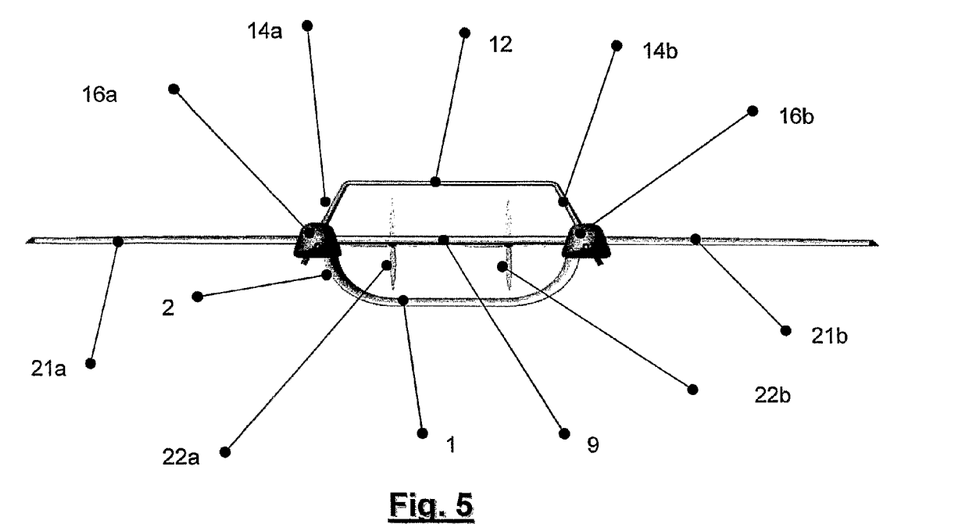
Figure 6:
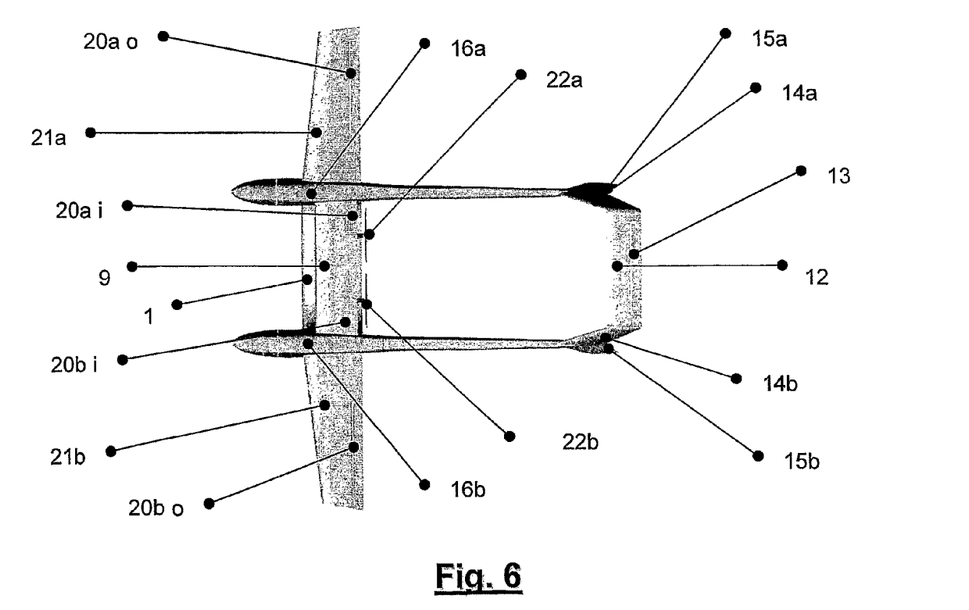
Figure 7:
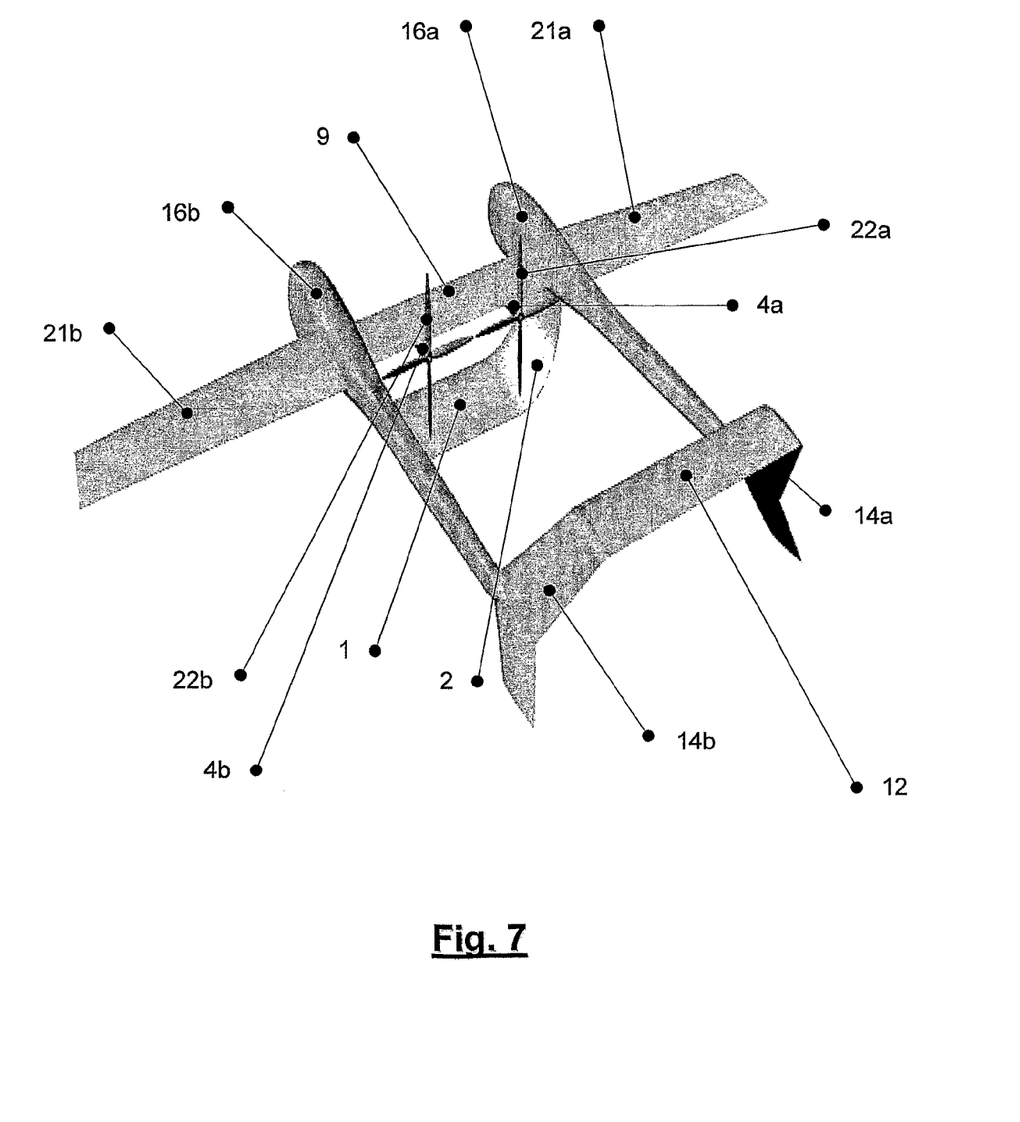

The shape, size and number of booms or fuselages may vary as shown in FIGS. 1,2, 1b, 3 and 4 that illustrate aircrafts of single boom, while FIGS. 5, 6 and 7 show double-boom crafts. In general, booms may be structured symmetrically or asymmetrically about the longitudinal axis of flight, as required by aerodynamic and/or operational consideration.

Referring to FIG. 2, it is to be understood that it refers to one non-binding example of a FLINDUCT-equipped craft that exhibits a boom 16, which sustains a tail unit comprising a rear wing that includes horizontal stabilizer 12, elevators 13, a pair of vertical fins 14, and rudders 15a and 15b.

It is noted that the size and shape of the tail unit and its structure, and the spatial relationships between the elements of the tail unit may vary without departing from the spirit of the invention. For example, FIGS. 1b and 3 illustrate aircrafts in which the horizontal stabilizer 12 is connected to the upper end of vertical fins 14. Yet, in the additional example given in FIGS. 5 and 6, the horizontal stabilizer 12 is connected to the upper tips of sloped fins 14a and 14b, and in FIG. 7 horizontal stabilizer 12 is connected to the upper tip of sloped fins 14a 14b that are also connected to vertical fins.

In the same vein it is stated that FLINDUCT is compatible with tail-less crafts, with delta-wing crafts, with variable geometry crafts, with canard-fitted crafts, with flying-wing crafts, free-wing crafts, and in general with any kind of crafts propeller-actuated, or of hybrid actuation.

It is noted that the number of engines can be more than two.

It is further noted that multiple engines can be replaced by their equivalents. For example multiple engines can be replaced by a central power-plant that generates electric energy further used by electric-motors that actuate the propellers, the same being understood to be the case with mechanical, hydraulic or pneumatic means and transmissions used to provide propulsion.

FLINDUCT is served by at least two propellers, while more than a pair may be used. The propellers may be arranged in one or two rows. For example—the aircraft can include a row of propellers that are located in proximity to the leading edge of the FLINDUCT. Yet for another example—FLINDUCT can include a row of propellers that are located in proximity to its trailing edge. Yet for a further example—FLINDUCT can include tandem propellers fitted both over its leading and the trailing edges. Said propellers may have independent revolving directions.

And still, for yet other example, coaxial, contra-rotating propellers may be used, as well as coaxial differential angular-velocity propellers, or turbo-vane propellers.

The cited and explained drawings depict the simplicity and straight-forward dynamics associated with the many possible configurations of the proposed concept of which only a few are described here.

Arcuated tip 2' of the FLINDUCT can be canted at an angle towards the propellers for enhanced stream velocity. Former experiments conducted at Langley with state-of-the-art vertical winglets that enclose single propellers in open U channels, resulted in optimal effects at cants of 4°-5°.

FLINDUCT combines the proprieties of the channel-wing with the characteristics of an ordinary wing. The vector field of its lift is mainly perpendicular to the flat bottom of the elongated channel. This characteristic combined with the benefits derived from the arcuated tips result in a much higher lift/drag ratio than that exhibited by both the Custer-Wing and the Langley rectangular-section channel.

The propellers that act on FLINDUCT induce a high-celerity quasi-laminar flow in the elongated channel where a lift force is created that is higher than what would have been possible to obtain under similar conditions, if a state-of-the-art wing of same profile was used.

Optionally, the trailing edge of FLINDUCT can be shaped for controlled Coanda Effect, so that the quasi-laminar flow created by increased debit is deflected downwards at an angle θ that is greater than the ordinary slipstream angle β it includes, so that: $\Delta C_L = C_T \sin(\theta + \beta)$ For flow enhancement, it is conceivable that canting the curved portions of the FLINDUCT at an angle of 4° to 5° can correct the dispersion otherwise characteristic to propeller-tips.

When the Coanda Effect is used at the trailing edge of the FLINDUCT, the propeller-tip trajectory would be located at the smaller possible distance from that edge, thus eliminating contact-damage with minimum of stream-efficiency loss.

Based on accumulated experience, a thrust deflection of up to 165° is expected to materialize at the projected relative-velocities, as given by the relationship:

$$C_\mu = MV \cdot (QS)^{-1}$$

Where: $C_\mu$=momentum coefficient, M=mass flow rate, V=stream velocity, Q=dynamic pressure, and S=wing projected area.

FLINDUCT curved tips 2 also referred to as arcuated tips; behave aerodynamically as arched transversal winglets.

FLINDUCT is characterized by a much higher aspect ratio that a conventional wing given that it adds a "virtual span" to the aerodynamic structure so that smaller overall spans may be used at equal aerodynamic efficiency with larger ones.

The complementary outboard wings panels may be blown in a conventional way for providing thrust-reversing capability in addition to higher incremental lift. However, this supplementary option should be considered with a certain reserve of necessity as FLINDUCT would supply by itself all the operational needs of the craft.

When based on the result of the experiments conducted on the blown Custer wing $C_L$ of up to 20 are predicted for FLINDUCT.

It is to be noted that an aircraft may include FLINDUCT without outboard wings. Such a craft is said to be of wing-less configuration.

An aircraft equipped with shrouded FLINDUCT and multiple propellers is expected to have nearly VTOL characteristics, and is intended to fly at very low velocities for long periods.

The propulsion system may be actuated either by I.C. engines, or electrical motors.

The aircraft may be unmanned or manned.

The span of FLINDUCT may have any practical dimension, as imposed by the number and specifications of its propeller-array.

It can be equipped with one or more fuel tanks. The fuel tank or tanks may be optionally integrated in, or attached to FLINDUCT. FIG. 2 illustrates a fuel tank 5 that is attached to the arcuated tip 2 of the FLINDUCT.

The bottom part 1 of the FLINDUCT can be flat or slightly bowed in continuation to the arcuated tips.

The following terms are associated with the following numbers:

1—lower portion of the FLINDUCT.
2—arcuate sides of the FLINDUCT.
3a, 3b—shrouds.
4a, 4b—I.C. engines/electric motors.
5—fuel tank.
6—aircraft nose.
9, 9a, 9b—structural element, spar.
12—horizontal stabilizer.
13—elevator.
14—fin.
15a, 15b—rudders.
16, 16a, 16b—elongated structural element, boom, fuselage.
17—engine pylon.
18—stub.
20—aileron.
21a, 21b—supplementary wings.
22a, 22b—propellers.
23a, 23b—flaps.

Furthermore, those skilled in the art will recognize that boundaries between the functionality of the above described operations are merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

Thus, it is to be understood that the architectures depicted herein are merely exemplary, and that in fact many other architectures can be implemented which achieve the same functionality. In an abstract, but still definite sense, any arrangement of components designed to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

In addition, the invention is not limited to physical devices or units implemented in non-programmable hardware but can also be applied in programmable devices or units able to perform the desired device functions by operating in accordance with suitable program code. Furthermore, the devices may be physically distributed over a number of apparatuses, while functionally operating as a single device.

However, other modifications, variations, and alternatives are also possible. The specifications and drawings are, accordingly, to be regarded in an illustrative rather than in a restrictive sense.

The word 'comprising' does not exclude the presence of other elements or steps then those listed in a claim. Moreover, the terms "front," "back," "top," "bottom," "over," "under" "stagger", and the like in the description and in the claims, if any, are used for descriptive purposes and not necessarily for describing permanent relative positions. It is understood that the terms so used are interchangeable under appropriate circumstances such that the embodiments of the invention described herein are, for example, capable of operation in other orientations than those illustrated or otherwise described herein.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

I claim:

1. A wing comprising:
   a lower portion that is located between two curved portions of the wing; wherein the lower portion is substantially flat and the two curved portions of the wing extend above the lower portion;
   wherein the wing is arranged to support multiple engines that rotate multiple propellers, each propeller of the multiple propellers is more proximate to a trailing edge of the wing than to a leading edge of the wing and is arranged to introduce a quasi-laminar stream when positioned in proximity to the trailing edge of the wing and is circulated at a desired speed;
   wherein the wing partially surrounds a space that is wider than twice a diameter of each propeller out of the multiple propellers,
   wherein a tip trajectory of each propeller of the multiple propellers at least partially overlaps the space; and
   multiple shrouds, each shroud being located above a propeller of the multiple propellers and partially surrounds the propeller;
   wherein a combination of the lower portion of the wing and the shroud substantially surrounds the propeller.

2. The wing according to claim 1, further comprising a pair of supplementary wings that are parallel to the lower portion and higher than the lower portion.

3. The wing according to claim 1 wherein a shape formed by the multiple shrouds differs from a mirror image of a shape formed by the lower portion and two curved portions of the wing.

4. The wing according to claim 1 wherein the curved portions are connected to supplementary wings at a location that is below half a height of the curved portions.

5. The wing according to claim 1 wherein the curved portions are connected to wing stubs that in turn are connected to supplementary wings.

6. The wing according to claim 1 wherein the trailing edge of the wing is shaped for obtaining a Coanda effect.

7. The wing according to claim 1 wherein tip trajectories of different propellers are proximate to each other.

8. An aircraft comprising:
   a wing; and
   multiple propellers that are rotated by multiple engines;
   wherein the multiple propellers are more proximate to a trailing edge of the wing than to a leading edge of the wing, the wing comprises a lower portion that is located between two curved portions;
   wherein the lower portion is substantially flat and the two curved portions extend above the lower portion and form arcuate ends of the lower portion;
   wherein the wing defines a space that is wider than twice a diameter of a propeller out of the multiple propellers; wherein a majority of the lower portion is not positioned directly below any element of the aircraft; and multiple shrouds, each shroud being located above a propeller of the multiple propellers and partially surrounds the propeller; wherein a combination of the lower portion of the wing and the shroud substantially surrounds the propeller.

9. The aircraft according to claim 8 wherein the wing defines a space that is wider than three times a diameter of the propeller.

10. The aircraft according to claim 8 wherein the lower portion extends beyond the curved portions of the wing so that a rear end of the lower portion is positioned beyond a rear end of each of the two curved portions of the wing.

11. The aircraft according to claim 8 wherein an upper end of each of the curved portions of the wing is connected to an end of one shroud out of multiple shrouds that are located above propellers.

12. The aircraft according to claim 8 wherein the propellers are behind the trailing edge of the wing.

13. The aircraft according to claim 8 wherein a cross section of the wing taken along a longitudinal axis of the wing has (a) a flat lower portion that corresponds to the lower portion of the wing and (b) a pair of fraction of a circle shaped portions that extend from the flat lower portion and correspond to the curved portions of the wing.

14. The aircraft according to claim 8 wherein the curved portions are connected to supplementary wings at a location that is above half a height of the curved portions.

15. The aircraft according to claim 8 wherein a cross section of the wing taken along a longitudinal axis of the wing has (a) a flat lower portion that corresponds to the lower portion of the wing and (b) a pair of fraction of a circle shapes portions that extend from the flat lower portion and correspond to the curved portions of the wing.

\* \* \* \* \*